United States Patent [19]

Takahashi

[11] Patent Number: 4,810,072
[45] Date of Patent: Mar. 7, 1989

[54] ZOOM LENS
[75] Inventor: Sadatoshi Takahashi, Tokyo, Japan
[73] Assignee: Canon Kabushiki Kaisha, Tokyo, Japan
[21] Appl. No.: 217,057
[22] Filed: Jul. 8, 1988

Related U.S. Application Data

[63] Continuation of Ser. No. 812,394, Dec. 23, 1985, abandoned.

[30] Foreign Application Priority Data

Dec. 22, 1984 [JP] Japan .................................. 59-271490
Oct. 14, 1985 [JP] Japan .................................. 60-228423

[51] Int. Cl.$^4$ ..................... G02B 15/177; G02B 15/00; G02B 13/18
[52] U.S. Cl. .................................. 350/427; 350/423; 350/432
[58] Field of Search ............... 350/423, 427, 432, 443, 350/457

[56] References Cited

U.S. PATENT DOCUMENTS 4,509,833 4/1985 Ikemori .............................. 350/427
4,571,031 2/1986 Kato ................................. 350/432 X

FOREIGN PATENT DOCUMENTS 117209 11/1983 Japan .................................. 350/427

*Primary Examiner*—John K. Corbin
*Assistant Examiner*—Ronald M. Kachmarik
*Attorney, Agent, or Firm*—Fitzpatrick, Cella, Harper & Scinto

[57] ABSTRACT

A zoom lens comprising, from front to rear, a first lens unit of negative power, a second lens unit of positive power and a third lens unit, the first and second lens units being axially movable for zooming, and the zoom lens satisfying the following conditions:

$$1.2 f_W < |f_1| < 1.6 f_W$$

$$0.9 f_W < f_2 < 1.3 f_W$$

$$-0.35/f_T < 1/f_3 < 0.3/f_T$$

$$0.85 f_W < l_{1W} < 1.2 f_W$$

$$0 < l_{2W}/f_W < 0.3$$

$$0 < l_{1T}/f_W < 0.2$$

$$0.7 < (l_{2T} - l_{2W})/f_W < 1.2$$

$$1.2 < |\beta_{2T}| < 1.1 \sqrt{f_T/f_W}$$

where $F_1$, $f_2$ and $f_3$ are the focal lengths of the first, second and third lens units respectively, $l_{1W}$ and $l_{2W}$ are the first and second separations between the first and second lens units and between the second and third lens units respectively when in the wide angle end, $l_{1T}$ and $l_{2T}$ are the first and second separations when in the telephoto end, $\beta_{2T}$ is the image magnification of the second lens unit in the telephoto position, and $f_W$ and $f_T$ are the shortest and longest focal lengths of the entire zoom lens system respectively.

8 Claims, 14 Drawing Sheets

ZOOM LENS

This application is a continuation of application Ser. No. 812,394 filed Dec. 23, 1985, now abandoned.

BACKGROUND OF THE INVENTION

1. Field of the Invention

This invention relates to zoom lenses and more particularly to zoom lenses preceded by a lens unit of negative power and haing three lens units in total of which the first two counting from front are axially moved to vary the image magnification. Still more particularly it relates to zoom lenses of reduced size with high zoom ratio.

2. Description of the Prior Art

The zoom lenses for photography which have achieved minimization of the size of lens system in such a manner that the entire system is shortened not only in the longitudinal direction but also in the lateral direction are known, as, for example, disclosed in Japanese Laid-Open Patent Applications Nos. SHO 58-111013, 58-178316, 59-16248 and 59-18917. Any of these zoom lenes is comprised of three lens units of which the first counting from front is of negative power, the second is of positive power, and these two are axially moved to effect zooming.

Of these, Japanese Laid-Open Patent Applications Nos. SHO 58-111013 and 58-178316 have achieved the advance in that respect by taking the so-called 2-unit type zoom lens as the basic configuration, but their zoom lenses having a zoom ratio of a little less than 2 cannot be said to be of high range.

Meanwhile, Japanese Laid-Open Patent Application No. SHO-59-18917 shows a zoom lens whose range begins with a somewhat wide angle, speaking in terms of 35 mm Leica format, 28 mm, while still permitting the range to be extended to as high as three. But, the total length of the entire system is long, and its diameter is large, so that this zoom lens becomes slightly bulkier than the standard.

SUMMARY OF THE INVENTION

It is an object of the present invention to provide a zoom lens of increased angular field in the wide angle zooming position with a high range while preserving as almost equal a total length to that of the conventional zoom lens whose zoom ratio is about 2.

A second object is to reduce the number of lens elements in the first lens unit.

To accomplish these objects of the invention, a zoom lens comprising, from front to rear, a first lens unit of negative power, a second lens unit of positive power, and a third lens unit, the first and second lens units being moved axially to effect zooming, has the following features:

$$1.2 f_W < |f_1| < 1.6 f_W \quad (1)$$

$$0.9 f_W < f_2 < 1.3 f_W \quad (2)$$

$$-0.35/f_T < 1/f_3 < 0.3/f_T \quad (3)$$

$$0.85 f_W < l_{1W} < 1.2 f_W \quad (4)$$

$$0 < l_{2W}/f_W < 0.3 \quad (5)$$

$$0 < l_{1T}/f_W < 0.2 \quad (6)$$

$$0.7 < (l_{2T} - l_{2W})/f_W < 1.2 \quad (7)$$

$$1.2 < |\beta_{2T}| < 1.1\sqrt{f_T/f_W} \quad (8)$$

where $f_1$, $f_2$ and $f_3$ are the focal lengths of the first, second and third lens units respectively, $l_{1W}$ and $l_{2W}$ are the first and second separations between the first and second lens units and between the second and third lens units respectively when in the wide angle end, $l_{1T}$ and $l_{2T}$ are the first and second separations respectively when in the telephoto end, $\beta_{2T}$ is the image magnification of the second lens unit in the telephoto end, and $f_W$ and $f_T$ are the shortest and longest focal lengths of the entire zoom lens system respectively.

For the reduction of the number of lens elements in the first lens unit, a zoom lens comprising, from front to rear, a first lens unit of negative power, a second lens unit of positive power, and a third lens unit which is stationary during zoooming, the separation between the first and second lens units and the separation between the second and third lens units being varied to vary the image magnification, has a feature that the first lens unit includes a meniscus-shaped lens of negative power convex toward the front, a negative lens of which the rear surface is stronger in curvature than the front surface thereof, and a meniscus-shaped lens of positive power convex toward the front, whereby at least one of the lens surfaces in the first lens unit is made aspherical with such a form that the positive refractive power increases as the height from the optical axis increases.

These and other objects and features of the invention will become apparent from the following detailed description of preferred embodiments thereof by reference to the drawings.

DETAILED DESCRIPTION OF THE PREFERRED EMBODIMENTS

Figure 1:
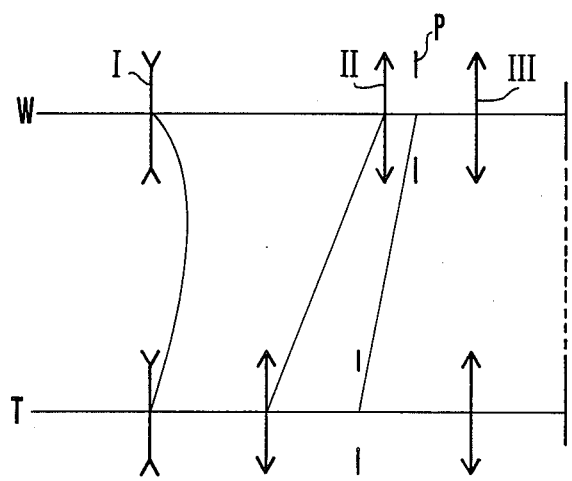
FIG. 1 is a schematic diagram of a zoom lens of the invention with its lens units all shown as a thin lens system.

The present invention in the zoom lens of the 3-unit type with the negative first and positive second lens units has set forth the above-stated various conditions for the axial movements of the first and seacond lens units. When these conditions are satisfied, a great increase in the zooming range with the limitation of the size of the entire system to a minimum is attained.

In order to improve compact form of the 3-unit zoom lens as in the invention, a good compromise between the requirements:

(1) that the diameter of the first lens unit be reduced, and (2) that the total length of the entire system be shortened. must be sought.

Determination of the diameter of the first lens unit is made, in the case of the zooming arrangement of the invention where the diaphragm often takes its place in the second lens unit, by a condition of admitting of as large oblique beam as axial beam in the wide angle end of the maximum possible image angle. Particularly when the focusing provision is made at the first lens unit, it is determined to admit of the oblique beam for the object at the minimum object distance in the wide angle end.

Meanwhile, in order to achieve a shortening of the total length of the entire system, it is of importance to efficiently play the second lens unit for varying the magnification. The magnification varying function depends strongly on the refractive powers and image magnifications of the first and second lens units. Since the range is increased by relying particularly on the method of increasing the total zooming movement of the secondlens unit as the variator, because, as the first and second lens units are prevented from interfering each other mechanically, the separation between the first and second lens units will have to be increased, and this will immediately call for an increase in the diameter of the first lens unit, for these objections are precluded, it becomes of great importance to set forth a rule of design for the paraxial arrangement of the first and second lens units.

The above-stated various conditions (1) to (8) have their background on all the foregoing factors of the invention. Technial significances of each of the inequalities of conditions (1) to (8) will next be explained.

Inequalities of condition (1) concern with a range of refractive powers of the first lens unit. When the upper limit is exceeded, as the refractive power of the first lens unit becomes too weak, the refractive power of the second lens unit must be weakened and the total zooming movement of the second lens unit must be increased. Or otherwise, the required value of zoomratio could not be obtained, and the first and second lens units would interfere with each other when in the telephoto positions. As a result, the separation between the first and second lens units in the wide angle positions is increased. To admit of as large oblique beam as axial beam in the wide angle end, the diameter of the front members must be increased. Also, in case when the first lens unit is moved forward to effect focusing down to shorter object distances, the total focusing movement is caused to increase. This calls for a further increase in the diameter of the first lens unit to admit of as large oblique beam as axial beam for the object at the minimum distance when in the wide angle end.

When the lower limit of condition (1) is exceeded, as the refractive power of the first lens unit becomes too strong, distortion is increased in the negative sense largely when in the wide angle positions, becoming difficult to correct. Also when zoomed to the telephoto end and thereabout, the first lens unit produces large spherical aberration which is also difficult to well correct. Also in case when focusing is performed by the first lens unit, a large range of variation of spherical aberration results. Particularly in the telephoto positions, as focusing is effected down to shorter object distances, it is over-corrected objectionably.

Inequalities of condition (2) concern with a range of refractive power of the second lens unit. When the upper limit is exceeded, as the refractive power of the second lens unit becomes too weak, because the variation of the image magnification of the entire system is mainly shared by the second lens unit, the total zooming movement of the second lens unit must be increased in order to insure that the zoom ratio of the entire system, that is, the full range of variation of magnification of the second lens unit is obtained. As a result, the total length of the entire system becomes longer. Such increase also causes the amount of movement of an object point for the second lens unit to increase by increasing the total zooming movement of the first lens unit. This calls for a further increase in the total length of the entire system. Also because the back focal distance is increased, the optical total length is increased objectionably.

When the lower limit is exceeded, as the refractive power of the second lens unit becomes too strong, variation of spherical aberration with zooming is increased so that the spherical aberration in both of the wide angle and telephoto ends is difficult to well correct, and also to be well balanced with that in the intermediate zooming positions. Also because the stronger refractive power of the second lens unit must be met with a stronger negative refractive power of the third lens unit, such second and such third lens units take a form of the strong telephoto type with a very short back focal distance. In the single lens reflex camera, therefore, the quick return mirror is unable to flip upward. Also because the refractive power of the third lens unit must be strengthened, the complexity of structure is increased objectionably over the entire system.

Inequalities of condition (3) give a proper range for the refractive power of the third lens unit. When the upper limit is exceeded, because the increase in the refractive power of the third lens unit is reflected to a decrease in the refractive power of the second lens unit, the above-described problems are encountered. When the lower limit is exceeded, as the refractive power of the third lens unit increases in the negative sense, this reflects to an automatic increase in the positive refractive power of the second lens unit. As has been described above, therefore, variation of aberrations of the second lens unit increases, and the required value of the back focal distance becomes difficult to obtain. For these reasons, the third lens unit preferably has a weak refractive power as shown by the condition (3). It is more preferred that the third lens unit is constructed with a cemented doublet consisting of, from front to rear, a negative lens of high refractive index and a positive lens of lower refractive index than that of the negative lens, and this doublet is formed to meniscus shape convex toward the rear, for the meridional image surface can be over-corrected by the oblique pencil of rays passing through the last lens at higher heights when in the telephoto positions than when in the wide angle positions. Another advantage arising from the use of the cemented lens is that the Petzval sum which would otherwise take a value of zero or of negative sign, is changed to an appropriate positive value.

Inequalities of condition (4) give limitations for the air separation between the first and second lens units in the wide angle end. When the upper limit is exceeded, the separation between the first and second lens units in the wide angle end becomes too long to minimize the diameter of the first lens unit, for, as the distance between the first lens unit and a diaphragm positioned adjacent the second lens unit becomes farther, as large oblique beam as axial beam is admitted of. Such increase in the diameter causes the total length of the entire system to increase in order to insure that either the minimum acceptable edge thickness or central thickness of each lens elements is established.

When the lower limit is exceeded, the space that allows for variation of the air separation to produce the required value of zoom ratio become insufficient to avoid mechanical interference between the first and second lens units in the telephoto end. If this is avoided by increasing the refractive powers of the first and second lens units, the conditions (1), (2) and (3) will be no longer established.

Inequalities of condition (5) concern with a range for the air separation between the second and third lens units in the wide angle end. When the upper limit is exceeded, the total length of the entire system becomes too long to be necessary, and it also becomes difficult to secure a sufficiently long back focal distance. When the lower limit is exceeded, the second and third lens units come to interfere with each other mechanically.

Inequalities of condition (6) concern with a range for the air separation between the first and second lens units in the telephoto end. When the upper limit is exceeded, a dead space is included, causing involvement of the increase of the diameter of the first lens unit and of the increase of the total length of the entire system as has described in connection with condition (4). When the lower limit is exceeded, the air separation between the first and second lens units in the telephoto end becomes too rarrow to avoid mechanical interference betweeen these lens units.

Inequalities of condition (7) concern with a range for the total zooming movement of the second lens unit. When the upper limit is exceeded, the total length of the entire system is caused to increase. When the lower limit is exceeded, it becomes difficult to establish the prescribed value of zoom ratio.

Inequalities of condition (8) concern with a range for the image magnification of the second lens unit in the telephoto end. When the upperlimit is exceeded, the total length of the lens system becomes far longer in the telephoto end than in the wide angle end. Further, if the magnification of the second lens unit is allowed to operate in a wider range of larger than unity, aberrations of the second lens unit vary largely with zooming, and particularly spherical aberration is increased in the telephoto end. When the lower limit is exceeded, the total length of the lens system becomes very long conversely in the wide angle end than in the telephoto end. Further, the air separation between the first and second lens units becomes longer than necessary. To admit of as large oblique beam as axial beam, therefore, the diameter of the first lens unit must be increased.

In the invention, when the above-stated features or rules of design are satisfied, a zoom lens which enables the zoom ratio to be increased to as high as about 2.5, while still maintaining the total length of the lens system at almost equal a value to that of the conventional zoom lens whose zoom ratio is about 2 can be achieved.

For note, in the invention, focusing is preferably performed by moving the first lens unit, because the aberrations can be maintained stable throughout the entire focusing range. Yet, either the third lens unit, or the entire lens system, may be moved to effect focusing.

It is also preferred in the invention to use a flare cut stop as arranged in between the second and third lens units to move in differential relation to the first and second lens units when zooming, for the flare component of the oblique beam is removed. It is particularly advantageous to move the flare cut stop forward as zooming goes from the wide angle to the telephoto end.

Four exammples of specific zoom lenses of the invention can be constructed in accordance with the numerical data given in the following tables for the radii of curvature, R, the axial thicknesses or air separations, D, and the refractive indices, N, and Abbe numbers, $\nu$, of the glasses of the various lens elements with the subscripts numbered consecutively from front to rear.

An equation for an aspherical surface is given below:

$$x = R\{1 - (1 - h^2/R^2)^{\frac{1}{2}}\} + Bh^2 + Ch^4 + Dh^6$$

where x is the departure of the asphere from the osculating sphere having a radius of curvature R in the axial distance measured from the vertex at a height h, and B, C and D are the aspherical coefficients.

| Numerical Example 1 (FIGS. 2 and 6A–6C) | | | |
|---|---|---|---|
| F = 29.0–67.8    FNO = 1:3.6–4.6    2ω = 73.4°–35.4° | | | |
| R1 = 57.10 | D1 = 5.00 | N1 = 1.60311 | ν1 = 60.7 |
| R2 = −464.79 | D2 = 0.12 | | |
| R3 = 1373.26 | D3 = 1.75 | N2 = 1.80400 | ν2 = 46.6 |
| R4 = 19.05 | D4 = 5.50 | | |
| R5 = −3259.04 | D5 = 1.36 | N3 = 1.80400 | ν3 = 46.6 |
| R6 = 52.83 | D6 = 2.36 | | |
| R7 = 30.66 | D7 = 2.73 | N4 = 1.80518 | ν4 = 25.4 |
| R8 = 92.38 | D8 = Variable | | |
| R9 = 28.25 | D9 = 2.90 | N5 = 1.69680 | ν5 = 55.5 |
| R10 = 235.10 | D10 = 1.50 | | |
| R11 = Diaphragm | D11 = 0.45 | | |
| R12 = 25.19 | D12 = 2.80 | N6 = 1.69680 | ν6 = 55.5 |
| R13 = 113.27 | D13 = 0.12 | | |
| R14 = 22.26 | D14 = 2.70 | N7 = 1.60311 | ν7 = 60.7 |
| R15 = 36.19 | D15 = 1.56 | | |
| R16 = −105.64 | D16 = 2.69 | N8 = 1.84666 | ν8 = 23.9 |
| R17 = 15.70 | D17 = 2.08 | | |
| R18 = 116.71 | D18 = 2.49 | N9 = 1.71736 | ν9 = 29.5 |
| R19 = −30.33 | D19 = Variable | | |
| R20 = Flare Cut Stop | D20 = Variable | | |
| R21 = −66.953 | D21 = 1.20 | N10 = 1.804 | ν10 = 46.6 |
| R22 = 97.621 | D22 = 4.00 | N11 = 1.54072 | ν11 = 47.2 |
| R23 = −39.134 | | | |

| Separations during Zooming | | | |
|---|---|---|---|
| | Focal Length | | |
| Separation | 29.0 | 48.4 | 67.8 |
| D8 | 28.532 | 9.264 | 1.022 |
| D19 | 0.104 | 5.859 | 11.614 |
| D20 | 1.54 | 9.54 | 17.54 |
| R19: Asphere | | | |
| $f_1 = -42.0$    $f_2 = 31.44$    $f_3 = -3686.3$ | | | |
| $\beta_{2T} = -1.529$ | | | |
| $B = -1.25144 \times 10^{-6}$, $c = -1.97423 \times 10^{-8}$, $D = 0$ | | | |

| Numerical Example 2 (FIGS. 3 and 7A–7C) | | | |
|---|---|---|---|
| F = 29–67.8    FNO = 1:3.6–4.6    2ω = 73.4°–35.4° | | | |
| R1 = 94.22 | D1 = 3.83 | N1 = 1.60311 | ν1 = 60.7 |
| R2 = −543.62 | D2 = 0.12 | | |
| R3 = 273.38 | D3 = 1.89 | N2 = 1.83400 | ν2 = 37.2 |
| R4 = 20.99 | D4 = 6.43 | | |
| R5 = −312.07 | D5 = 1.53 | N3 = 1.77250 | ν3 = 49.6 |
| R6 = 50.62 | D6 = 2.38 | | |
| R7 = 36.16 | D7 = 3.77 | N4 = 1.84666 | ν4 = 23.9 |
| R8 = 248.23 | D8 = Variable | | |
| R9 = 27.87 | D9 = 3.57 | N = 1.65160 | ν5 = 58.6 |

-continued

Numerical Example 2 (FIGS. 3 and 7A-7C)
F = 29-67.8   FNO = 1:3.6-4.6   2ω = 73.4°-35.4°

| | | | |
|---|---|---|---|
| R10 = 1550.26 | D10 = 1.53 | | |
| R11 = Diaphragm | D11 = 0.82 | | |
| R12 = 27.80 | D12 = 3.06 | N6 = 1.60311 | ν6 = 60.7 |
| R13 = 44.04 | D13 = 0.12 | | |
| R14 = 18.94 | D14 = 3.06 | N7 = 1.60311 | ν7 = 60.7 |
| R15 = 38.06 | D15 = 1.36 | | |
| R16 = −321.87 | D16 = 1.43 | N8 = 1.84666 | ν8 = 23.9 |
| R17 = 26.07 | D17 = 1.56 | N9 = 1.83400 | ν9 = 37.2 |
| R18 = 15.86 | D18 = 2.45 | | |
| R19 = 59.27 | D19 = 2.96 | N10 = 1.68250 | ν10 = 44.7 |
| R20 = −38.61 | D20 = Variable | | |
| R21 = Flare Cut Stop | D21 = Variable | | |
| R22 = −106.97 | D22 = 1.30 | N11 = 1.78590 | ν11 = 44.2 |
| R23 = 108.72 | D23 = 4.00 | N12 = 1.53172 | ν12 = 48.9 |
| R24 = −56.33 | | | |

Separations during Zooming

| | Focal Length | | |
|---|---|---|---|
| Separation | 29.0 | 48.4 | 67.8 |
| D8 | 30.880 | 9.781 | 0.757 |
| D20 | 0.050 | 6.027 | 12.113 |
| D21 | 2.500 | 11.521 | 24.952 |

R20: Asphere
$f_1 = -43.068$   $f_2 = 34.426$   $f_3 = 31984$
$\beta_{2T} = -1.529$
$B = 1.7506 \times 10^{-6}$, $C = -1.5367 \times 10^{-8}$, $D = 0$

Numerical Example 3 (FIGS. 4 and 8A-8C)
F = 29-67.8   FNO = 1:3.6-4.6   2ω = 73.4°-35.4°

| | | | |
|---|---|---|---|
| R1 = 101.01 | D1 = 3.80 | N1 = 1.60311 | ν1 = 60.7 |
| R2 = −330.75 | D2 = 0.12 | | |
| R3 = 454.54 | D3 = 1.85 | N2 = 1.83400 | ν2 = 37.2 |
| R4 = 20.54 | D4 = 6.45 | | |
| R5 = −176.85 | D5 = 1.50 | N3 = 1.77250 | ν3 = 49.6 |
| R6 = 63.28 | D6 = 2.22 | | |
| R7 = 37.82 | D7 = 3.50 | N4 = 1.84666 | ν4 = 23.9 |
| R8 = 364.99 | D8 = Variable | | |
| R9 = 38.75 | D9 = 3.00 | N5 = 1.65160 | ν5 = 58.6 |
| R10 = −1402.87 | D10 = 1.70 | | |
| R11 = Diaphragm | D11 = 0.70 | | |
| R12 = 26.09 | D12 = 3.60 | N6 = 1.60311 | ν6 = 60.7 |
| R13 = 68.02 | D13 = 0.12 | | |
| R14 = 20.00 | D14 = 4.30 | N7 = 1.51633 | ν7 = 64.1 |
| R15 = 36.83 | D15 = 1.43 | | |
| R16 = 725.62 | D16 = 2.94 | N8 = 1.84666 | ν8 = 23.9 |
| R17 = 16.34 | D17 = 2.00 | | |
| R18 = 68.26 | D18 = 2.80 | N9 = 1.74950 | ν9 = 35.3 |
| R19 = −43.49 | D19 = Variable | | |
| R20 = Flare Cut Stop | D20 = Variable | | |
| R21 = −72.22 | D21 = 1.30 | N10 = 1.72000 | ν10 = 43.7 |
| R22 = 90.17 | D22 = 4.10 | N11 = 1.54072 | ν11 = 47.2 |
| R23 = −47.58 | | | |

Separations during Zooming

| | Focal Length | | |
|---|---|---|---|
| Separation | 29.0 | 48.4 | 67.8 |
| D8 | 30.479 | 9.641 | 0.728 |
| D19 | 0.167 | 6.117 | 12.068 |
| D20 | 2.150 | 11.075 | 20.000 |

$f_1 = -42.424$   $f_2 = 34.0$   $f_3 = -6232.05$
$\beta_{2T} = -1.529$

Numerical Example 4 (FIGS. 5 and 9A-9C)
F = 29-67.8   FNO = 1:3.6-4.6   2ω = 73.4°-35.4°

| | | | |
|---|---|---|---|
| R1 = 52.10 | D1 = 1.80 | N1 = 1.79952 | ν1 = 42.2 |
| R2 = 18.50 | D2 = 7.00 | | |
| R3 = 11191.64 | D3 = 1.45 | N2 = 1.77250 | ν2 = 49.6 |
| R4 = 51.76 | D4 = 2.20 | | |
| R5 = 30.63 | D5 = 3.20 | N3 = 1.80518 | ν3 = 25.4 |
| R6 = 80.73 | D6 = Variable | | |
| R7 = 28.04 | D7 = 3.40 | N4 = 1.65160 | ν4 = 58.6 |
| R8 = 989.54 | D8 = 1.55 | | |
| R9 = Diaphragm | D9 = 0.45 | | |
| R10 = 29.67 | D10 = 2.80 | N5 = 1.60311 | ν5 = 60.7 |
| R11 = 47.51 | D11 = 0.12 | | |
| R12 = 17.76 | D12 = 2.80 | N6 = 1.60311 | ν6 = 60.7 |
| R13 = 44.09 | D13 = 1.62 | | |
| R14 = −891.52 | D14 = 1.30 | N7 = 1.84666 | ν7 = 23.9 |
| R15 = 23.00 | D15 = 1.48 | N8 = 1.83400 | ν8 = 37.2 |
| R16 = 15.00 | D16 = 2.16 | | |
| R17 = 70.04 | D17 = 2.60 | N9 = 1.72342 | ν9 = 38.0 |
| R18 = −39.48 | D18 = Variable | | |
| R19 = Flare Cut Stop | D19 = Variable | | |
| R20 = −61.96 | D20 = 1.20 | N10 = 1.78590 | ν10 = 44.2 |
| R21 = 1065.77 | D21 = 4.00 | N11 = 1.54814 | ν11 = 45.8 |
| R22 = −46.61 | | | |

Separation during Zooming

| | Focal Length | | |
|---|---|---|---|
| Separation | 29.0 | 48.4 | 67.8 |
| D6 | 29.389 | 9.380 | 0.821 |
| D18 | 0.202 | 6.186 | 12.170 |
| D19 | 1.8 | 10.1 | 18.4 |

$f_1 = -41.6$   $f_2 = 32.648$   $f_3 = -1522$
$\beta_{2T} = -1.529$

Additional embodiments of the invention in which, despite the number of lens elements in the first lens unit is limited to three, the image quality is preserved at a high level are next described. Ineach of these embodiments, the configuration of FIG. 1 is employed and as zooming from the wide angle to the telephoto end, the second lens unit is moved axially forward in differential relation to the first lens unit.

The flare cut stop P also is made to move forward when zooming from the wide angle to the telephoto end, thereby the flare component due to the upper rays of the meridional pencil mainly in the intermediate zooming positions is removed.

In these embodiments, by employing all the above-stated rules of design, and particularly by constructing the first lens unit from three lenses with the use of at least one aspherical surface of prescribed form, the semi-angular field in the wide angle end is made widened, in terms of the shortest focal length of the entire system, to a shorter value than 1.5 times the maximum image height, at a zoom ratio of about 2.5 with the limitation of the size of the entire system to a minimum, while still permitting good stability of aberration correction throughout the entire zooming range.

That is, the front lens in the first lens unit is made constructed in the negative meniscus form of forward convexity, thereby negative distortion in the marginal zone of the image format is reduced when in the wide angle end. As a rule, it is desirable that the middle lens has a form that the front surface is a strong convex surface toward the front from the standpoint of reducing distortion in the wide angle end. If so, the rear surface of the middle lens will become too heavy in the duty of contributing to a negative refractive power, thereby coma in the wide angle end and spherical aberration in the telephoto end are made more difficult to well correct. From these reasons, according to the invention, the middle lens is a negative lens with its rear surface having a strong negative refractive power. Thus, good correction of coma in the wide angle end and spherical aberration in the telephoto end is facilitated.

And the positive spherical aberration produced from these two surfaces of the middle lens is corrected when the rear lens is formed to the meniscus shape of positive refractive power convex toward the front. And, the residual negative distortion of the first lens unit in the wide angle end is cancelled by positive distortion produced from the application of asphere to at least one lens surface in the first lens unit, when the asphere has a form that the positive refractive power increases as the height from the optical axis increases.

Figure 10:
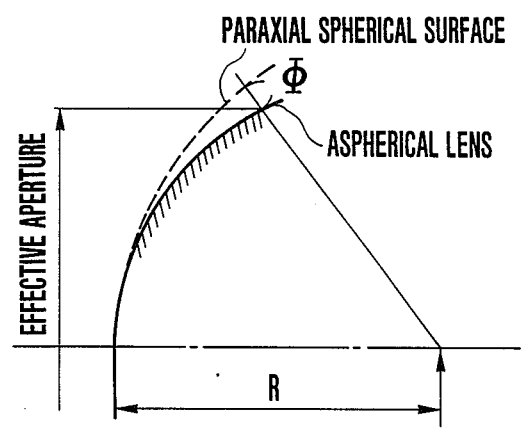
FIG. 10 is a diagram of defining an aspherical surface.
Figure 2:
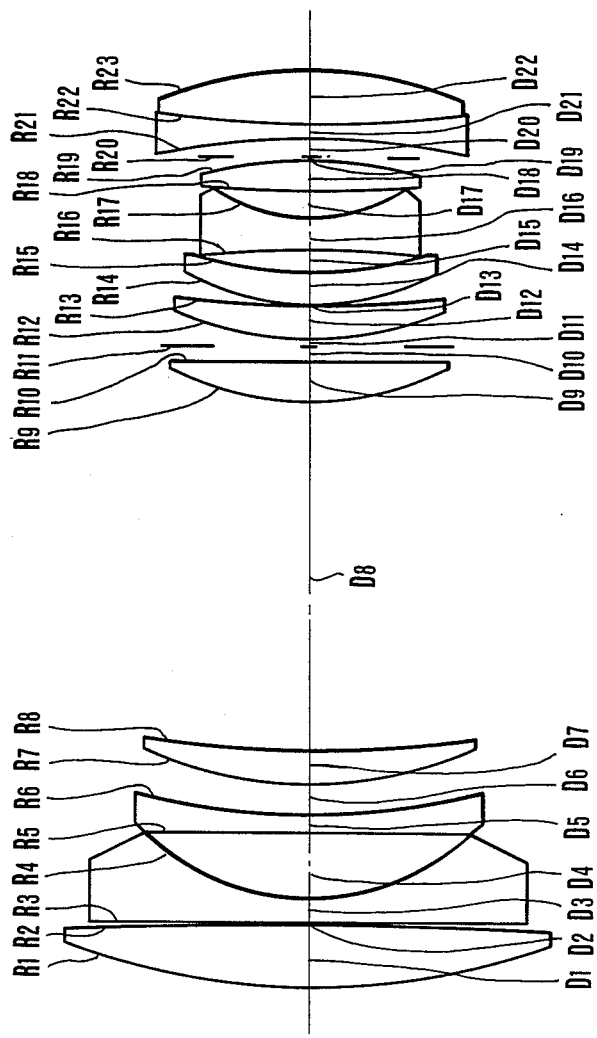
FIGS. 2 to 5 are longitudinal section views of examples of specific zoom lenses respectively.
Figure 3:
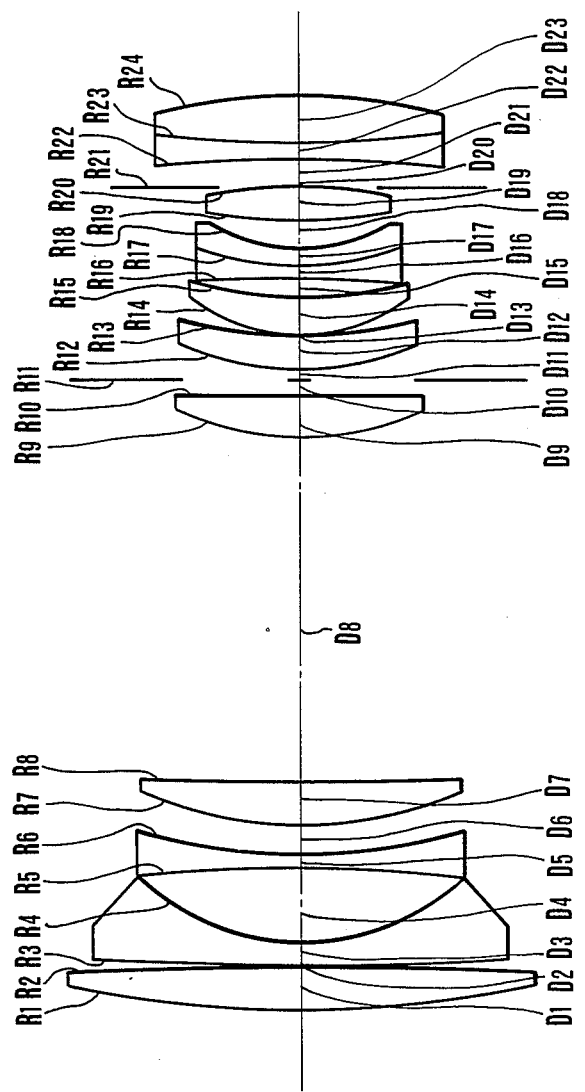
Figure 4:
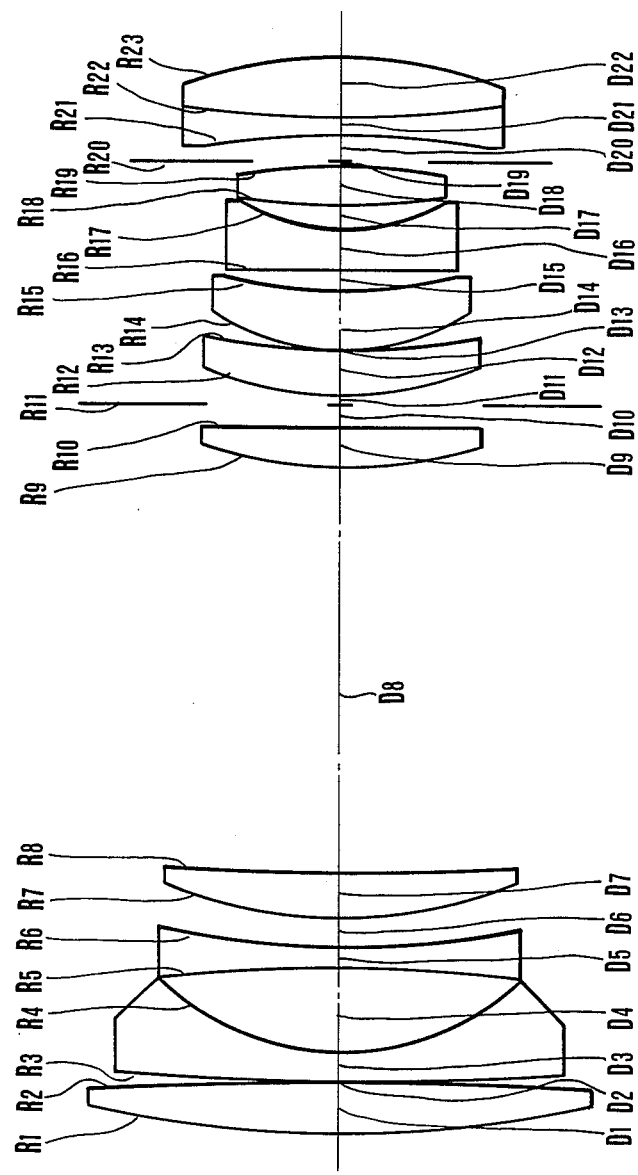
Figure 5:
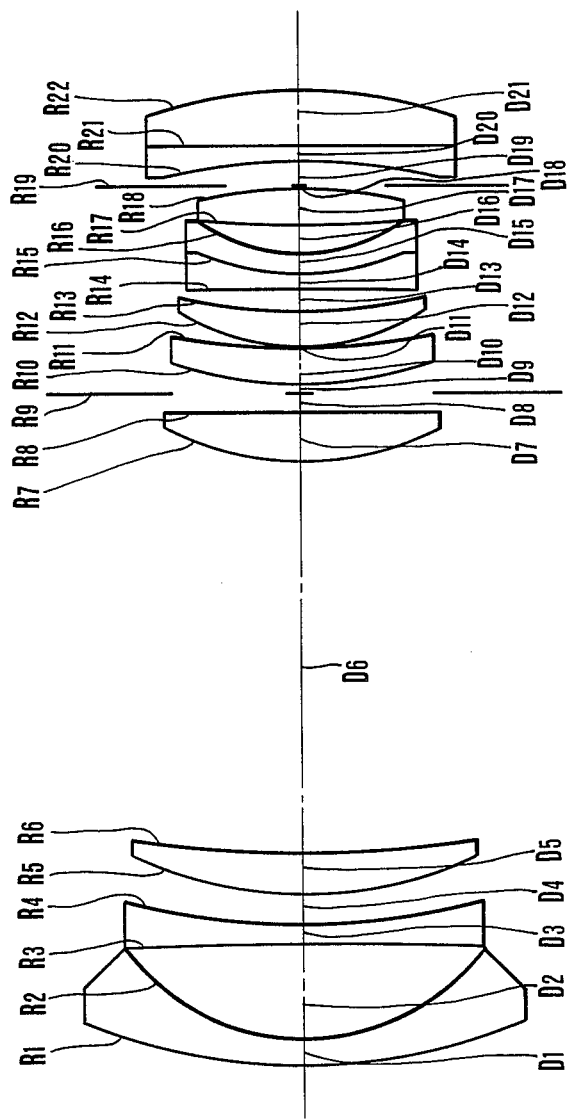
Figure 6A:
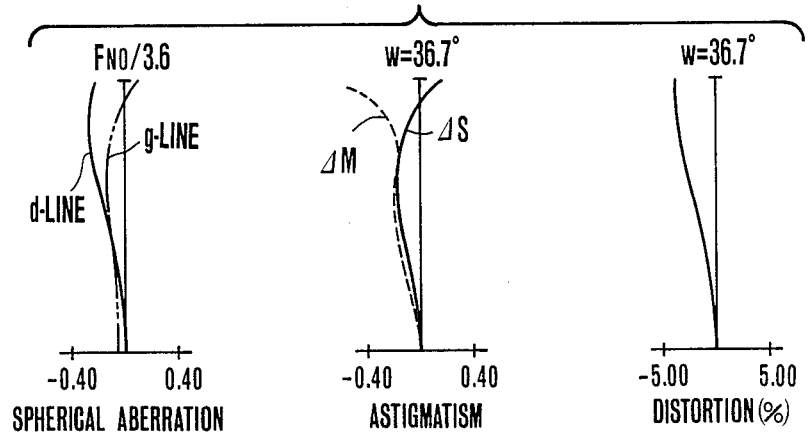
FIGS. 6A-6C to 9A-9C are graphic representations of the aberrations of the lenses of FIGS. 2 to 5 respectively.
Figure 6B:
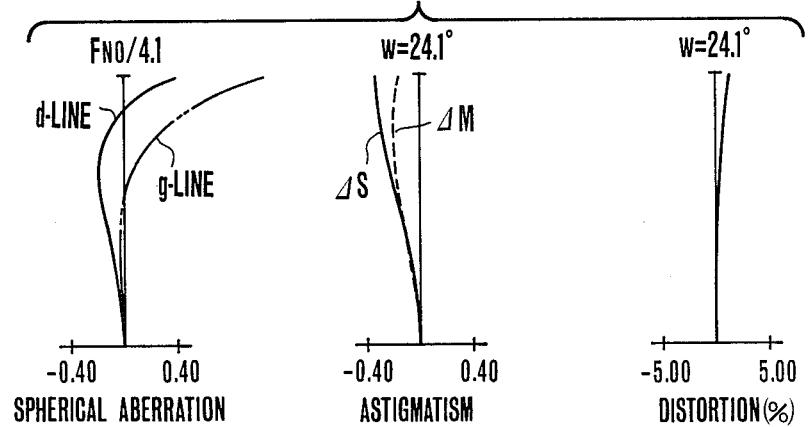
Figure 6C:
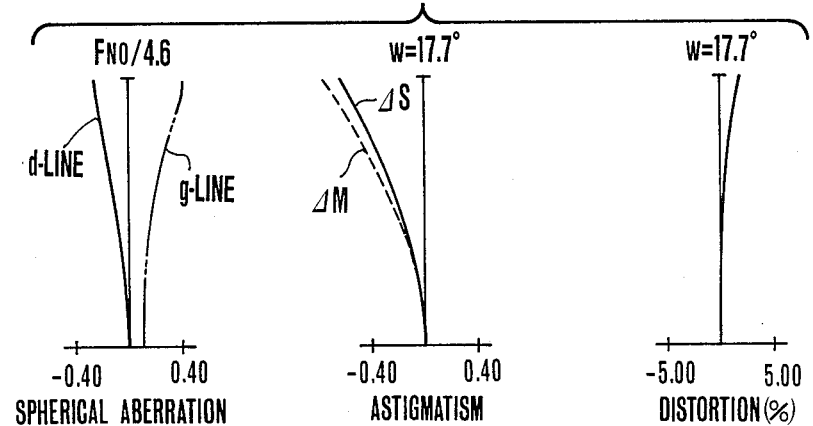
Figure 7A:
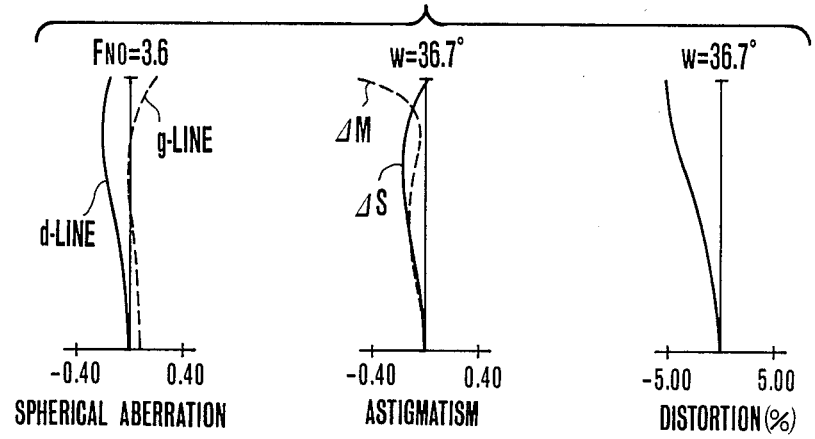
Figure 7B:
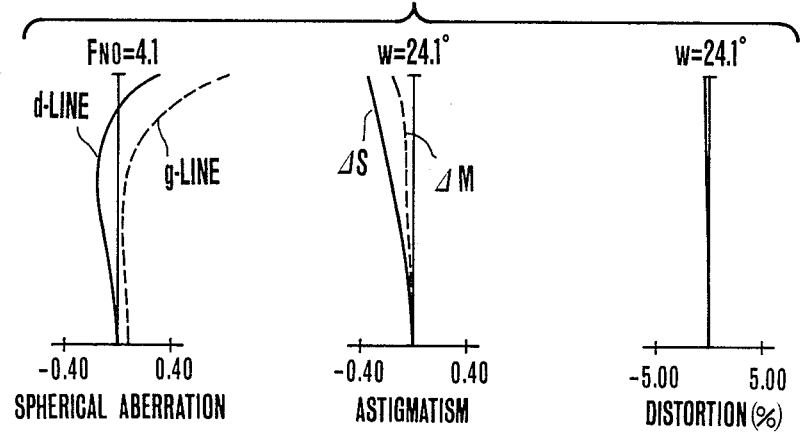
Figure 7C:
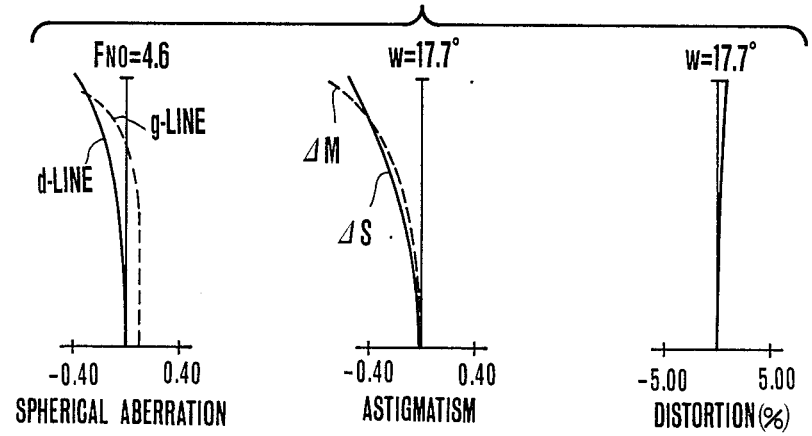
Figure 8A:
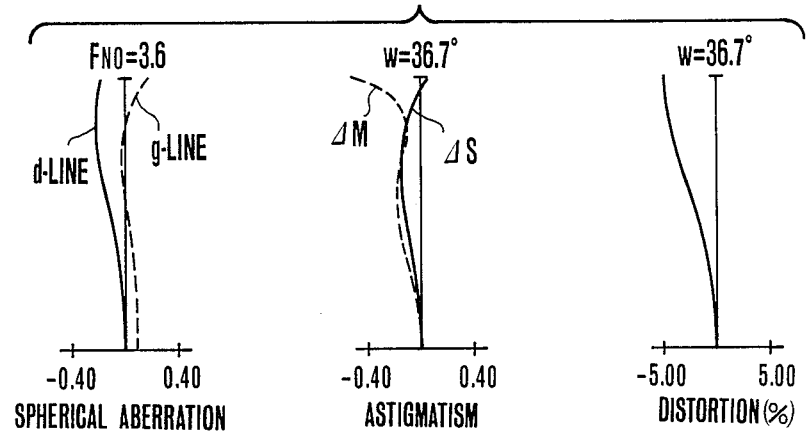
Figure 8B:
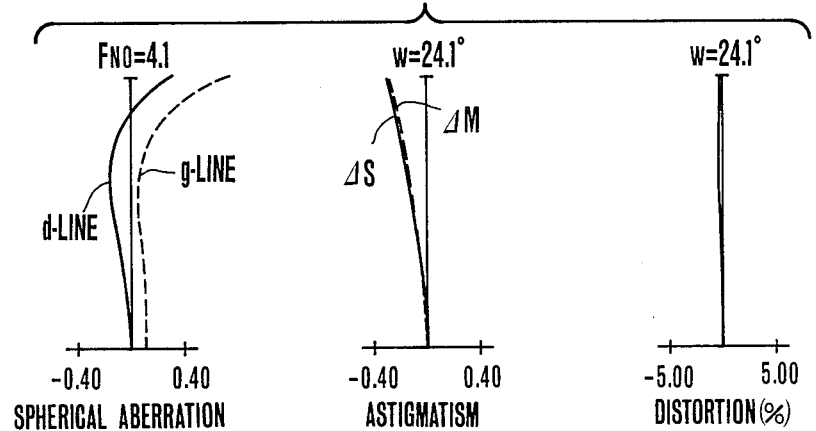
Figure 8C:
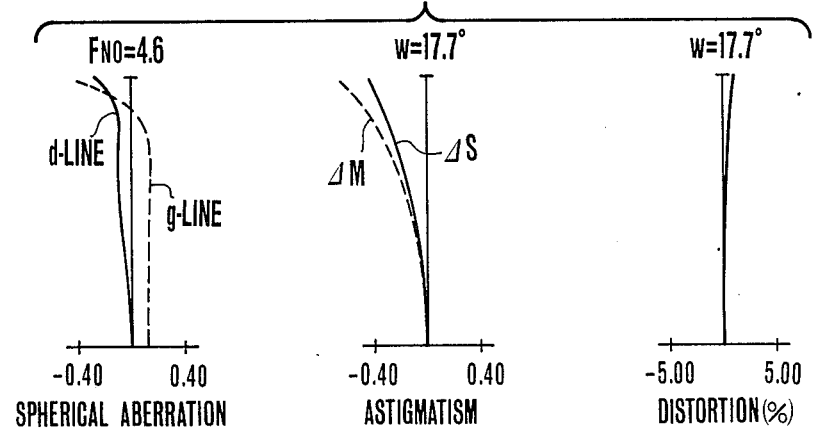
Figure 9A:
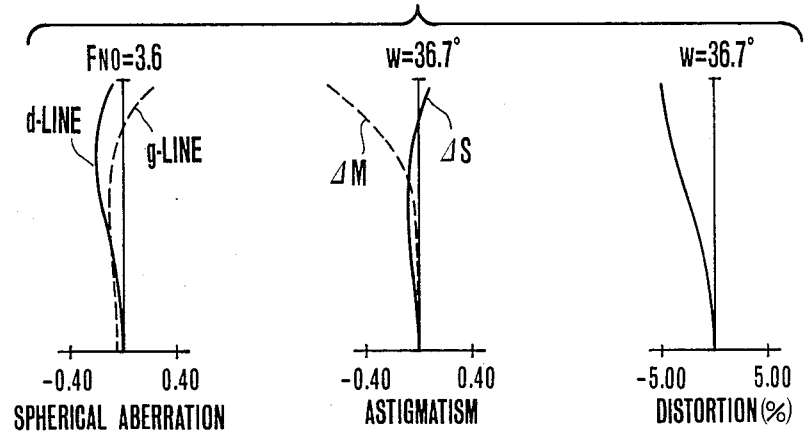
Figure 9B:
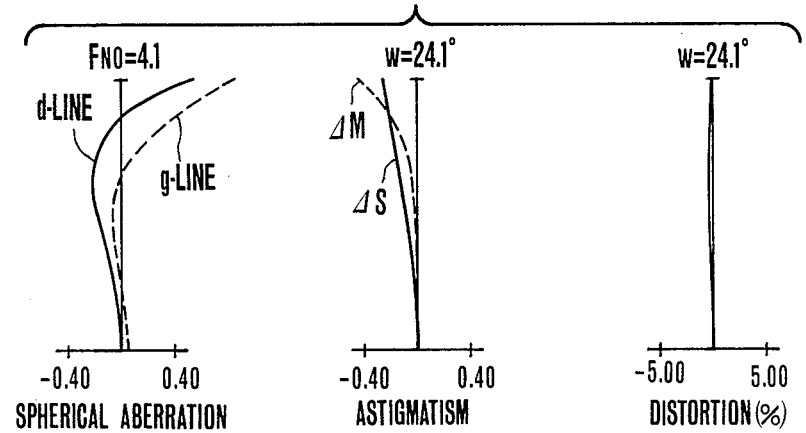
Figure 9C:
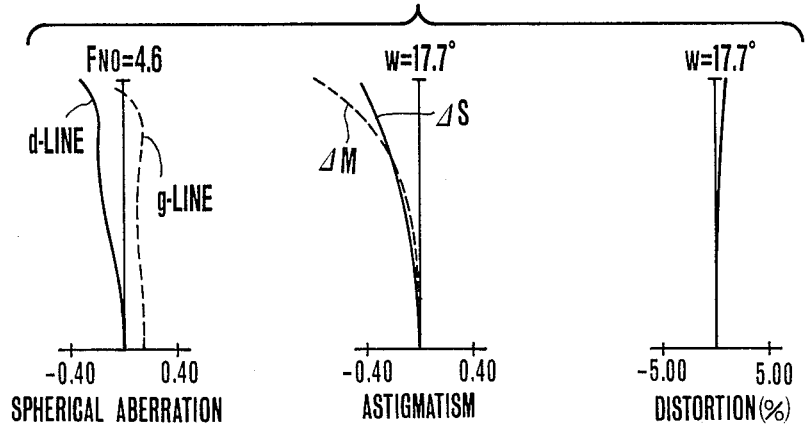
Figure 11:
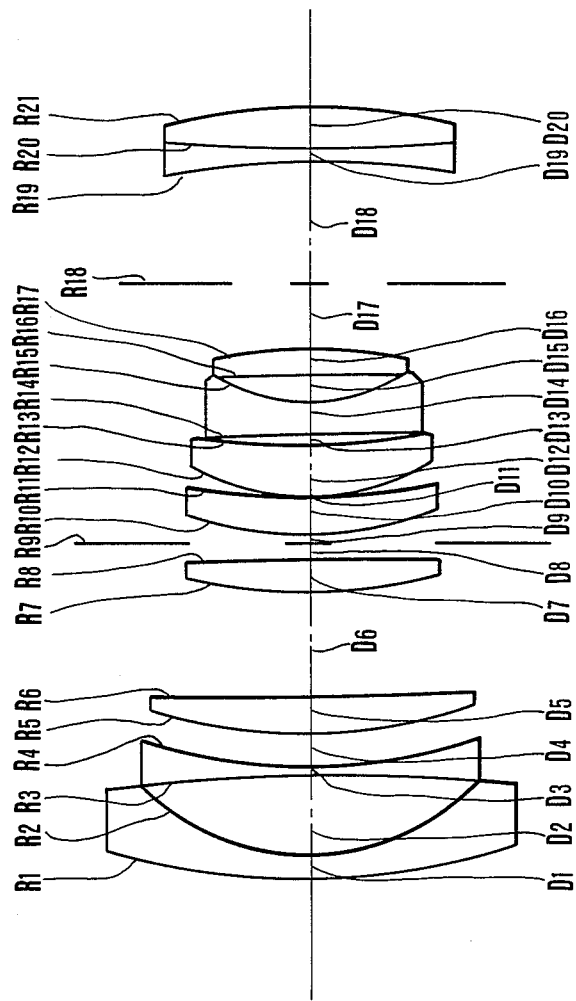
FIG. 11 is a block diagram of a general embodiment of the zoom lens according to the invention.
Figure 12A:
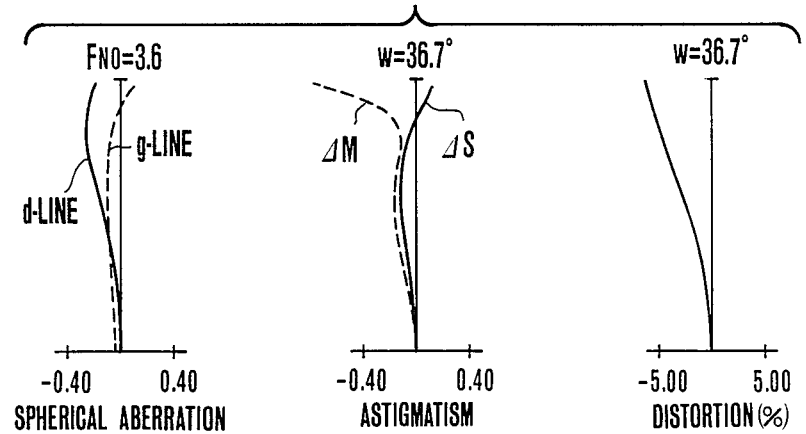
FIGS. 12A-12C to 15A-15C are graphic representations of the aberrations of additional four examples of specific zoom lenses respectively.
Figure 12B:
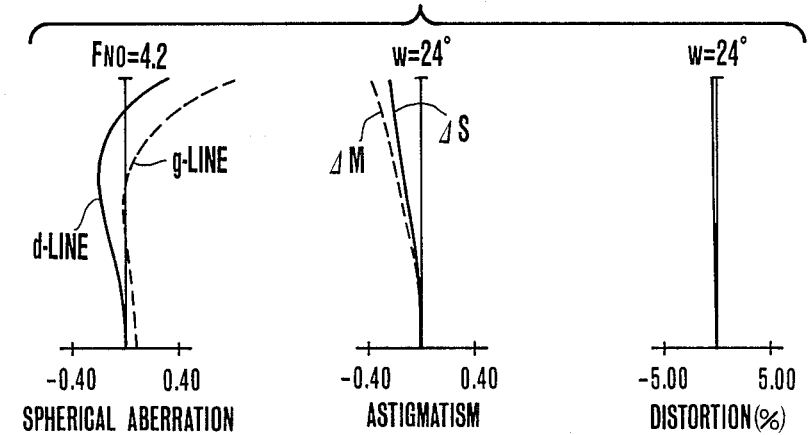
Figure 12C:
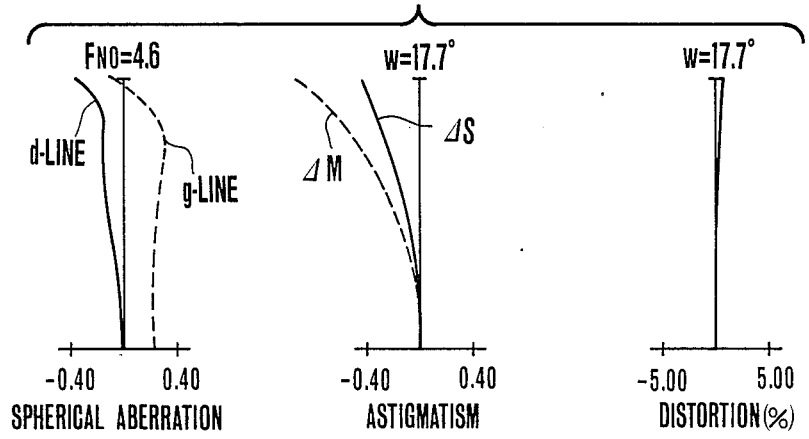

For this purpose, the general embodiment sets forth the following condition for a range of the aspherical quantity $\Phi$ defined by the radial distance from the paraxial sphere to the asphere at 0.9 of the effective aperture of the asphere as shown in FIG. 10 in terms of the shortest focal length $f_W$ of the entire system.

$$|\Phi/f_W| < 0.01 \quad (a)$$

When the upper limit of inequality of condition (a) is exceeded, though distortion in the wide angle end can be well corrected, astigmatism is increased, and particularly meridional image surface is under-corrected. This can be hardly well corrected even by the third lens unit which is stationary during zooming.

In specific embodiments of the invention, the required value of the aspherical quantity for good correction of distortion in the wide angle lens is, at any rate, on the order of $|\Phi/f_W| > 0.0025$. If smaller than this, under-correction of distortion will result.

Further, in the invention it is preferred to satisfy the following conditions:

$$-0.1 < -R4/R3 < 0.4 \quad (b)$$

$$1.4 < R4/R5 < 2.1 \quad (c)$$

where R is the i-th lens surface counting from front in the first lens unit.

Inequalities of condition (b) concern with the form of the middle lens. When the refractive power of the front lens surface is stronger in the negative sense than the upper limit, though variation of spherical aberration with zooming is reduced, distortion is increased in the negative sense in the wide angle end, and outward coma in the wide angle end is also increased.

When the refractive power of the rear surface is stronger in the negative sense than the lower limit, spherical aberration within the first lens unit is not fully corrected so that large residual spherical aberration is produced in the intermediate zooming positions, and variation of spherical aberration with focusing is increased. Further, sagittal flare is also increased.

Inequalities of condition (c) concern with a range for the refractive power ratio of the rear lens surface of the middle lens to the front surface of the rear lens. When the refractive power of the front surface of the rear lens is stronger than the upper limit, over-correction of spherical aberration results within the first lens unit, and color coma is increased in the wide angle positions.

When the refractive power of the rear lens surface of the middle lens is stronger than the lower limit, under-correction of spherical aberration results within the first lens unit. If the spherical aberration is corrected by utilizing the separation between the middle and rear lenses, the separation between the first and second lens units must be increased to retain the zoom ratio. As a result, the total length of the lens system is increased objectionably.

For note, in the embodiment using the aspherical surface in the first lens unit, the upper limit of inequalities of condition (1) may be extended up to $1.7f_W$, and the upper limit of inequalities of condition (4) to $1.3f_W$.

In any of the embodiments of the invention, it is preferred from the standpoint of aberration correction to construct the second lens unit from five lenses, or, from front to rear, three positive lenses, one negative lens and another positive lens.

It is also better to construct the third lens unit from two lenses of negative and positive refractive powers cemented together.

Focusing of any zoom lens of the invention may be carried out by moving the first lens unit with an advantage of facilitating good stability of aberration correction. Yet, the third lens unit may be otherwise used for focusing purposes.

| | Numerical Example 5 (FIGS. 11 and 12A-12C) | | | |
|---|---|---|---|---|
| | $F = 29-67.8$ | $FNO = 1:3.6-4.6$ | $2\omega = 73.4°-35.4°$ | |
| R1 = 63.31 | Asphere | D1 = 1.85 | N1 = 1.70154 | $\nu1$ = 41.2 |
| R2 = 18.64 | | D2 = 7.0 | | |
| R3 = −273.91 | | D3 = 1.5 | N2 = 1.75700 | $\nu2$ = 47.9 |
| R4 = 50.97 | | D4 = 2.4 | | |
| R5 = 33.37 | | D5 = 3.6 | N3 = 1.76182 | $\nu3$ = 26.6 |
| R6 = 160.82 | | D6 = Variable | | |
| R7 = 37.72 | | D7 = 3.0 | N4 = 1.65160 | $\nu4$ = 58.6 |
| R8 = 1872.09 | | D8 = 1.7 | | |
| R9 = Diaphragm | | D9 = 0.7 | | |
| R10 = 27.69 | | D10 = 3.4 | N5 = 1.60311 | $\nu5$ = 60.7 |
| R11 = 60.88 | | D11 = 0.27 | | |
| R12 = 19.23 | | D12 = 4.3 | N6 = 1.51633 | $\nu6$ = 64.1 |
| R13 = 52.47 | | D13 = 1.15 | | |
| R14 = 200350.68 | | D14 = 2.94 | N7 = 1.80518 | $\nu7$ = 25.4 |
| R15 = 16.02 | | D15 = 1.9 | | |
| R16 = 92.54 | | D16 = 2.6 | N8 = 1.74950 | $\nu8$ = 35.3 |

-continued

Numerical Example 5 (FIGS. 11 and 12A–12C)
F = 29–67.8  FNO = 1:3.6–4.6  2ω = 73.4°–35.4°

| | | | |
|---|---|---|---|
| R17 = −41.24 | D17 = Variable | | |
| R18 = Flare Cut Stop | D18 = Variable | | |
| R19 = −62.55 | D19 = 1.3 | N9 = 1.72000 | ν9 = 43.7 |
| R20 = 183.60 | D20 = 3.5 | N10 = 1.54869 | ν10 = 45.6 |
| R21 = −46.52 | | | |

Separation during Zooming

| Separation | Focal Length | | |
|---|---|---|---|
| | 29 | 48.4 | 67.8 |
| D6 | 30.367 | 9.543 | 0.635 |
| D17 | 0.340 | 6.285 | 12.230 |
| D18 | 2.150 | 11.075 | 20.000 |

A = 0, B = 1.30 × 10⁻⁶, C = 3.24 × 10⁻¹⁰,
D = 3.32 × 10⁻¹², E = 0

$A = 0, B = 1.30 \times 10^{-6}, C = 3.24 \times 10^{-10}, D = 3.32 \times 10^{-12}, E = 0$

Figure 13A:
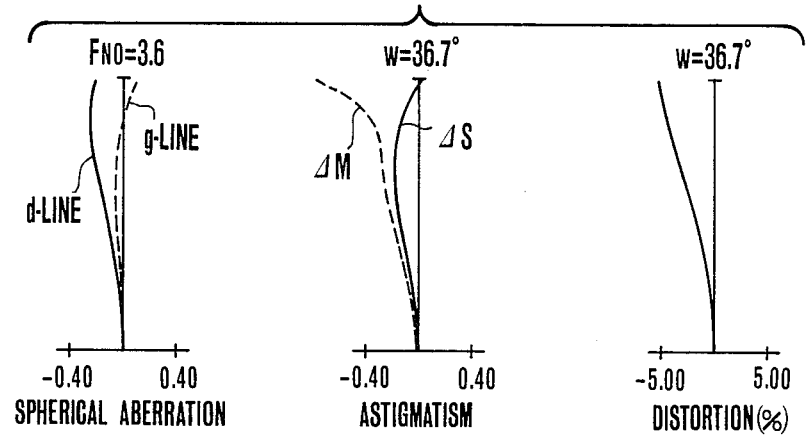
Figure 13B:
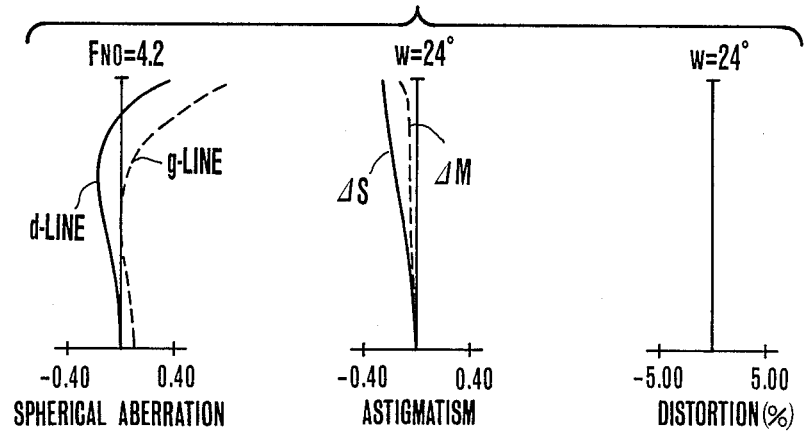
Figure 13C:
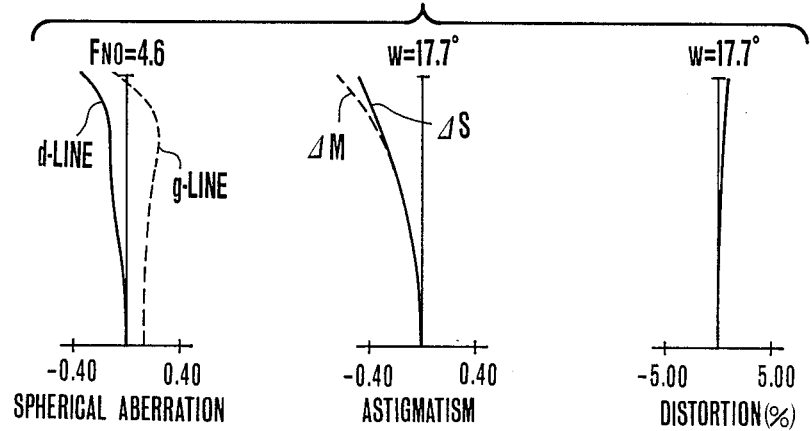

Numerical Example 6 (FIGS. 13A–13C)
F = 29–67.8  FNO = 1:3.6–4.6  2ω = 73.4°–35.4°

| | | | |
|---|---|---|---|
| R1 = 60.76  Asphere | D1 = 1.85 | N1 = 1.83400 | ν1 = 37.2 |
| R2 = 19.66 | D2 = 7.0 | | |
| R3 = −204.60 | D3 = 1.5 | N2 = 1.77250 | ν2 = 49.6 |
| R4 = 59.51 | D4 = 2.1 | | |
| R5 = 35.58 | D5 = 3.7 | N3 = 1.80518 | ν3 = 25.4 |
| R6 = 233.31 | D6 = Variable | | |
| R7 = 39.72 | D7 = 3.2 | N4 = 1.65160 | ν4 = 58.6 |
| R8 = 948.73 | D8 = 1.8 | | |
| R9 = Diaphragm | D9 = 0.7 | | |
| R10 = 26.44 | D10 = 4.0 | N5 = 1.60311 | ν5 = 60.7 |
| R11 = 75.94 | D11 = 0.28 | | |
| R12 = 21.60 | D12 = 4.6 | N6 = 1.60729 | ν6 = 59.4 |
| R13 = 54.69 | D13 = 1.0 | | |
| R14 = −838.54 | D14 = 3.2 | N7 = 1.84666 | ν7 = 23.9 |
| R15 = 16.16 | D15 = 2.1 | | |
| R16 = 100.37 | D16 = 2.6 | N8 = 1.69895 | ν8 = 30.1 |
| R17 = −37.77 | D17 = Variable | | |
| R18 = Flare Cut Stop | D18 = Variable | | |
| R19 = −60.59 | D19 = 1.3 | N9 = 1.78590 | ν9 = 44.2 |
| R20 = 666.96 | D20 = 3.5 | N10 = 1.53172 | ν10 = 48.9 |
| R21 = −40.66 | | | |

Separations during Zooming

| Separation | Focal Length | | |
|---|---|---|---|
| | 29.0 | 48.4 | 67.8 |
| D6 | 30.741 | 9.732 | 0.745 |
| D17 | 0.088 | 6.085 | 12.083 |
| D18 | 2.169 | 11.173 | 20.177 |

$A = 0, B = 9.80 \times 10^{-7}, C = 1.14 \times 10^{-9}$
$D = 1.51 \times 10^{-12}, E = 0$

Figure 14A:
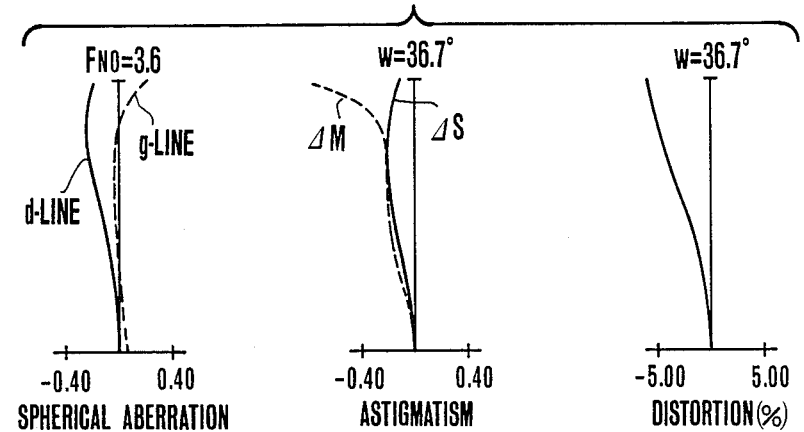
Figure 14B:
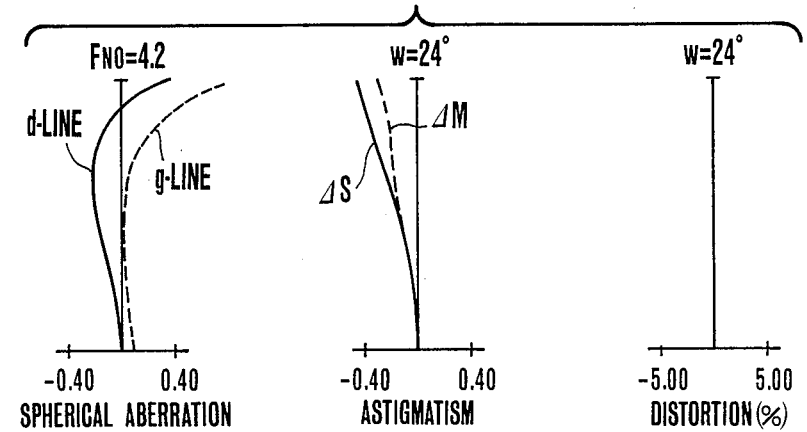
Figure 14C:
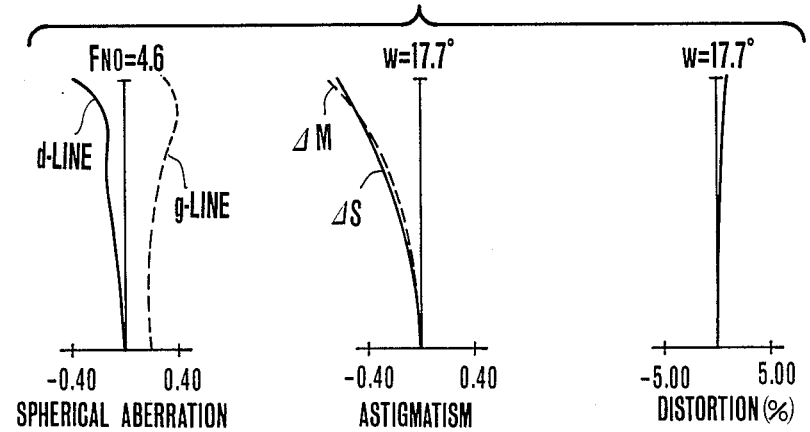

Numerical Example 7 (FIGS. 14A–14C)
F = 29–67.8  FNO = 1:3.6–4.6  2ω = 73.4°–35.4°

| | | | |
|---|---|---|---|
| R1 = 53.94 | D1 = 1.85 | N1 = 1.83400 | ν1 = 37.2 |
| R2 = 19.04 | D2 = 7.0 | | |
| R3 = −182.25 | D3 = 1.5 | N2 = 1.77250 | ν2 = 49.6 |
| R4 = 59.52 | D4 = 2.2 | | |
| R5 = 35.15 | D5 = 3.6 | N3 = 1.80518 | ν3 = 25.4 |
| R6 = 203.79 | D6 = Variable | | |
| R7 = 37.52 | D7 = 3.0 | N4 = 1.65160 | ν4 = 58.6 |
| R8 = −2850.43 | D8 = 1.7 | | |
| R9 = Diaphragm | D9 = 0.7 | | |
| R10 = 27.27 | D10 = 3.4 | N5 = 1.60311 | ν5 = 60.7 |
| R11 = 70.79 | D11 = 0.27 | | |
| R12 = 19.47 | D12 = 4.3 | N6 = 1.51633 | ν6 = 64.1 |
| R13 = 42.72 | D13 = 1.15 | | |
| R14 = 2371.94 | D14 = 2.94 | N7 = 1.84666 | ν7 = 23.9 |
| R15 = 16.28 | D15 = 1.95 | | |
| R16 = 81.24 | D16 = 2.8 | N8 = 1.68893 | ν8 = 31.1 |
| R17 = −37.37 | D17 = Variable | | |
| R18 = Flare Cut Stop | D18 = Variable | | |
| R19 = −62.54 | D19 = 1.3 | N9 = 1.74400 | ν9 = 44.7 |
| R20 = 103.44 | D20 = 3.5 | N10 = 1.58900 | ν10 = 48.6 |
| R21 = −46.25 | | | |

Separations during Zooming

| Separation | Focal Length | | |
|---|---|---|---|
| | 29 | 48.4 | 67.8 |
| D6 | 30.439 | 9.615 | 0.707 |
| D17 | 0.434 | 9.379 | 12.324 |
| D18 | 2.150 | 11.075 | 20 |

$A = 0, B = 9.78 \times 10^{-7}, C = 5.86 \times 10^{-10}$,
$D = 3.1 \times 10^{-12}, E = -6.28 \times 10^{-16}$

Figure 15A:
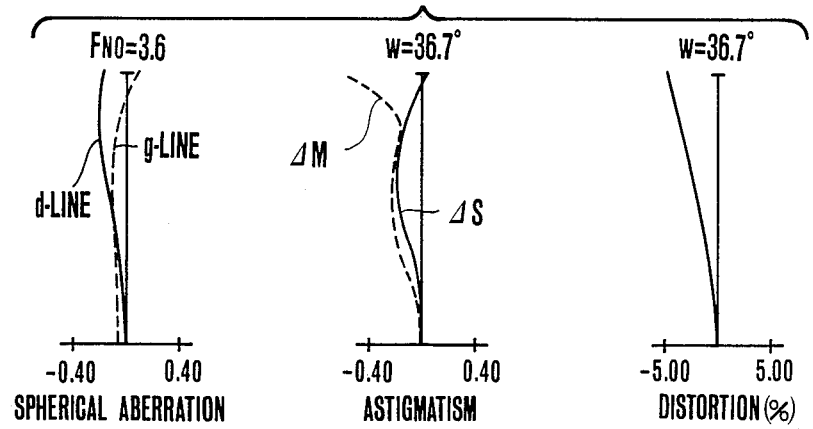
Figure 15B:
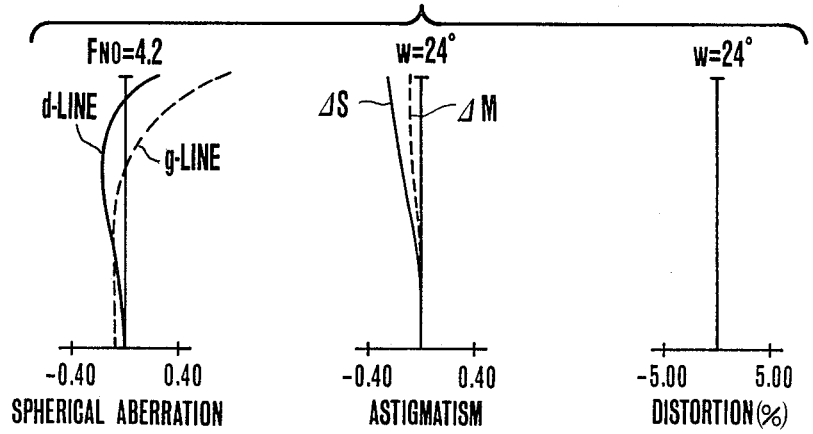
Figure 15C:
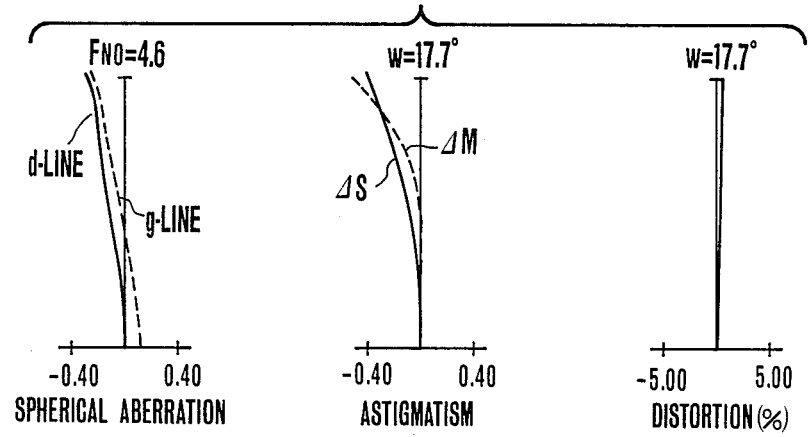

Numerical Example 8 (FIGS. 15A–15C)
F = 29.0–67.8  FNO = 1:3.6–4.6  2ω = 73.4°–35.4°

| | | | |
|---|---|---|---|
| R1 = 67.22 | D1 = 1.9 | N1 = 1.72000 | ν1 = 50.2 |
| R2 = Asphere | D2 = 7.75 | | |
| R3 = −281.22 | D3 = 1.5 | N2 = 1.83400 | ν2 = 37.2 |

-continued

Numerical Example 8 (FIGS. 15A-15C)
F = 29.0-67.8   FNO = 1:3.6-4.6   2ω = 73.4°-35.4°

| | | | |
|---|---|---|---|
| R4 = 71.55 | D4 = 2.0 | | |
| R5 = 35.45 | D5 = 3.9 | N3 = 1.76182 | ν3 = 26.6 |
| R6 = 214.68 | D6 = Variable | | |
| R7 = 39.01 | D7 = 3.1 | N4 = 1.60311 | ν4 = 60.7 |
| R8 = −903.41 | D8 = 1.8 | | |
| R9 = Diaphragm | D9 = 0.7 | | |
| R10 = 24.76 | D10 = 4.5 | N5 = 1.48749 | ν5 = 70.2 |
| R11 = 96.37 | D11 = 0.28 | | |
| R12 = 19.74 | D12 = 4.2 | N6 = 1.48749 | ν6 = 70.2 |
| R13 = 44.96 | D13 = 1.15 | | |
| R14 = −580.44 | D14 = 3.0 | N7 = 1.84666 | ν7 = 23.9 |
| R15 = 17.07 | D15 = 2.05 | | |
| R16 = 135.51 | D16 = 2.6 | N8 = 1.78472 | ν8 = 25.7 |
| R17 = −39.57 | D17 = Variable | | |
| R18 = Flare Cut Stop | D18 = Variable | | |
| R19 = −43.44 | D19 = 1.3 | N9 = 1.83400 | ν9 = 37.2 |
| R20 = −51.80 | D20 = 2.3 | N10 = 1.48749 | ν10 = 70.2 |
| R21 = −36.81 | | | |

Separations during Zooming

| Separation | Focal Length | | |
|---|---|---|---|
| | 29 | 50 | 67.8 |
| D6 | 32.495 | 9.200 | 0.754 |
| D17 | 0.308 | 7.583 | 13.750 |
| D18 | 2.300 | 12.205 | 20.600 |

$A = 2.71 \times 10^{-2}$, $B = 1.69 \times 10^{-5}$,
$C = 1.48 \times 10^{-8}$, $D = 5.17 \times 10^{-11}$

| Factor | Numerical Example | | | |
|---|---|---|---|---|
| | 1 | 2 | 3 | 4 |
| f1 | −42.0 | −43.07 | −42.4 | −41.6 |
| f2 | 31.44 | 34.4 | 34 | 32.65 |
| f3 | −3686 | 31984 | −6232 | −1522 |
| Φ | | | | 0.100 |
| −R4/R3 | | | | −0.0046 |
| R4/R5 | | | | 1.69 |

| Factor | Numerical Example | | | |
|---|---|---|---|---|
| | 5 | 6 | 7 | 8 |
| f1 | −42.4 | −43 | −42.42 | −45 |
| f2 | 34.0 | 34.29 | 34 | 36.275 |
| f3 | −4454 | 4100 | −5413 | 795.76 |
| Φ | 0.199 | 0.147 | 0.132 | 0.214 |
| −R4/R3 | 0.186 | 0.291 | 0.326 | 0.254 |
| R4/R5 | 1.53 | 1.67 | 1.69 | 2.02 |

According to the present invention it is made possible for the zoom lens to achieve an increase in the total angular field up to 73.4° in the wide angle end along with an increase in the range to about 2.5 while still maintaining all aberrations stable throughout the extended zooming range without involving any increase in the size of the entire lens system and a simplified structure of construction of the lenselements, and therefore to provide a zoom lens suited for use in still cameras or video cameras.

What is claimed is:

1. A zoom lens, comprising, from front to rear, a first lens unit of negative refractive power, a second lens unit of positive refractive power, and a third lens unit, said first and second lens units being movable for zooming, and said third lens unit being stationary during zooming, and said first lens unit consisting of a positive lens convex toward the object, a negative meniscus lens convex toward the object, and a bi-concave lens with a stronger concave surface toward the image side, and a positive meniscus lens convex toward the object, and satisfying the following conditions:

$$1.2f_W < |f_1| < 1.6f_W$$

$$0.85f_W < l_{1W} < 1.2f_W$$

$$0.7 < (l_{2T} - l_{2W})/f_W < 1.2$$

wherein $f_W$ represents a total focal length at the wide angle end of zooming, $f_1$ represents a focal length of the first lens unit, $l_{1W}$ represents a distance between the first lens unit and the second lens unit at the wide angle end, $l_{2T}$ and $l_{2W}$ represent the distance between the second lens unit and the third lens unit at the telephoto end, and the distance between the second lens unit and the third lens unit at the wide angle end, respectively.

2. A zoom lens, comprising, from front to rear, a first lens unit of negative refractive power, a second lens unit of positive refractive power, and a third lens unit, said first and second lens units being movable for zooming and said third lens unit being stationary during zooming, said first lens unit consisting of a positive lens convex toward the object, a negative meniscus lens convex toward the object, a bi-concave lens having a stronger concave surface toward the image side, and a positive meniscus lens convex toward the object, and satisfying the following conditions:

$$1.2f_W < |f_1| < 1.6f_W$$

$$0.85f_W < l_{1W} < 1.2f_W$$

$$0.7 < (l_{2T} - l_{2W})/f_W < 1.2$$

$$0.35/f_T < 1/f_3 < 0.3/f_T$$

wherein $f_W$ represents a total focal length at the wide angle end of zooming, $f_1$ represents a focal length of the first lens unit, $l_{1W}$ represents a distance between the first lens unit and the second lens unit at the wide angle end, $l_{2T}$ and $l_{2W}$ represent the distance between the second lens unit and the third lens unit at the telephoto end, $lf_T$ represents the focal length of the entire system at the telephoto end of zooming, $f_3$ represents the focal length of the third lens unit, and the distance between the second lens unit and the third lens unit at the wide angle end, respectively.

3. A zoom lens according to claim 1 or 2, wherein said third lens unit has a positive refractive power.

4. A zoom lens unit according to claim 1 or 2, wherein said third lens unit is a cemented lens of a negative lens and a positive lens.

5. A zoom lens according to claim 2, wherein said first lens unit has a single aspherical surface.

6. A zoom lens according to claim 1 or 2, further comprising a stop independently movable in the same direction as said second lens unit.

7. A zoom lens, comprising, from front to rear, a first lens unit of negative refractivepower, a second lens unit of positive refractive power, and a third lens unit, said first and second lens units being movable for zooming, and said third lens unit being stationary during zooming, and said first lens unit consisting of a negative meniscuslens convex toward the object, and a bi-concave lens with a stronger concave surface toward the image side, and a positive meniscus lens convex toward the object, and satisfying the following conditions:

$$1.2f_W < |f_1| < 1.6f_W$$

$$0.85f_W < l_{1W} < 1.2f_W$$

$$0.7 < (l_{2T} - l_{2W})/f_W < 1.2$$

wherein $f_W$ represents a total focal length at the wide angle end of zooming, $f_1$ represents a focal length of the first lens unit, $l_{1W}$ represents a distance between the first lens unit and the second lens unit at the wide angle end, $l_{2T}$ and $l_{2W}$ represent the distance between the second lens unit and the third lens unit at the telephoto end, and the distance between the second lens unit and the third lens unit at the wide angle end, respectively.

8. A zoom lens according to claim 7, further satisfying the following condition:

$$-0.35/f_T < 1/f_3 < 0.3/f_T$$

wherein $f_T$ represents the focal length of the whole system at the telephoto end of zooming and $f_3$ represents the focal length of the third lens unit.

* * * * *

UNITED STATES PATENT AND TRADEMARK OFFICE
CERTIFICATE OF CORRECTION

PATENT NO. : 4,810,072  
DATED : March 7, 1989  
INVENTOR(S) : SADATOSHI TAKAHASHI It is certified that error appears in the above-identified patent and that said Letters Patent is hereby corrected as shown below:

Cover Page,

[57], 10th line from end, "$F_1$" should read --$f_1$--.

Column 1, line 9, "and" should read --and,--;
line 10, "ticularly" should read --ticularly,--;
line 11, "haing" should read --having--;
line 12, "front" should read --the front--;
line 13, "Still more particularly it" should read --Still, more particularly, the invention--;
line 18, "system" should read --systems--;
line 34, "Meanwhile," should be deleted.

Column 2, line 58, "seacond" should read --second--;
line 68, "ened." should read --ened,--.

Column 3, line 19, "secondlens" should read --second lens--;
line 20, "interfering" should read --interfering with--;
line 30, "Technial" should read --Technical--;
line 38, "zoomratio" should read --zoom ratio--.

UNITED STATES PATENT AND TRADEMARK OFFICE
CERTIFICATE OF CORRECTION

PATENT NO. : 4,810,072
DATED : March 7, 1989
INVENTOR(S) : SADATOSHI TAKAHASHI

It is certified that error appears in the above-identified patent and that said Letters Patent is hereby corrected as shown below:

Column 5, line 2, "elements" should read --element--;

line 5, "become" should read --becomes--;

line 24, "has" should be deleted;

line 28, "rarrow" should read --narrow--;

line 38, "upperlimit" should read --upper limit--.

Column 6, line 3, "exammples" should read --examples--;

line 55, "c =" should read --C = --;

line 68, "N = 1.65160" should read --N5 = 1.65160--.

Column 8, line 46, "Ineach" should read --In each--.

Column 10, line 3, "R" should read --Ri--;

line 7, "lis" should read --is--.

Column 13, line 56, "lenselements," should read --lens elements,--.

Column 14, line 35, "$0.35/f_T < 1/f_3 < 0.3/f_T$" should read -- $-0.35/f_T < 1/f_3 < 0.3/f_T$ --;

UNITED STATES PATENT AND TRADEMARK OFFICE
CERTIFICATE OF CORRECTION

PATENT NO. : 4,810,072  Sheet 3 of 3
DATED : March 7, 1989
INVENTOR(S) : SADATOSHI TAKAHASHI It is certified that error appears in the above-identified patent and that said Letters Patent is hereby corrected as shown below:

Column 14, line 39, "unit, $l_{1W}$" should read --unit $f_T$ represents the focal length of the entire system at the telephoto end of zooming, $f_3$ represents the focal length of the third lens unit, $l_{1W}$--;

line 42, "$lf_T$" should be deleted;

lines 43-44 should be deleted;

line 45, "of the third lens unit," should be deleted;

line 59, "refractivepower," should read --refractive power,-- line 64, "meniscuslens" should read --meniscus lens--.

Signed and Sealed this

Seventeenth Day of October, 1989

Attest:

DONALD J. QUIGG

Attesting Officer

Commissioner of Patents and Trademarks